(12) United States Patent
Gatos

(10) Patent No.: US 8,668,072 B2
(45) Date of Patent: Mar. 11, 2014

(54) MACHINE AND METHOD FOR FORMING GROUPS OF PRODUCTS TO BE CASED

(75) Inventor: David Gatos, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 13/519,788

(22) PCT Filed: Dec. 27, 2010

(86) PCT No.: PCT/FR2010/052920
§ 371 (c)(1),
(2), (4) Date: Jun. 28, 2012

(87) PCT Pub. No.: WO2011/080480
PCT Pub. Date: Jul. 7, 2011

(65) Prior Publication Data
US 2012/0325622 A1 Dec. 27, 2012

(30) Foreign Application Priority Data
Dec. 30, 2009 (FR) ...................................... 0959662

(51) Int. Cl.
*B65G 25/00* (2006.01)
*B65G 47/52* (2006.01)
(52) U.S. Cl.
USPC ............ 198/431; 198/429; 198/736; 198/749
(58) Field of Classification Search
USPC ......... 198/373, 416, 429, 431, 432, 736, 747, 198/749
See application file for complete search history.

(56) References Cited

U.S. PATENT DOCUMENTS

| 2,684,799 | A | * | 7/1954 | Holstein | 53/496 |
| 2,712,376 | A | * | 7/1955 | Bruestle | 198/431 |
| 3,724,639 | A | * | 4/1973 | Hara | 198/430 |
| 3,978,970 | A | * | 9/1976 | Reimers | 414/789.5 |
| 6,164,045 | A | * | 12/2000 | Focke et al. | 53/543 |
| 8,167,113 | B2 | | 5/2012 | Mougin et al. | |
| 2010/0193326 | A1 | | 8/2010 | Mougin et al. | |
| 2010/0193327 | A1 | * | 8/2010 | Mougin et al. | 198/429 |
| 2012/0118701 | A1 | * | 5/2012 | Duchemin et al. | 198/429 |
| 2012/0273324 | A1 | * | 11/2012 | Mougin et al. | 198/426 |

FOREIGN PATENT DOCUMENTS

| EP | 1052200 | A1 | | 11/2000 |
| EP | 1847488 | A1 | * | 10/2007 |
| EP | 2204342 | A1 | | 7/2010 |
| FR | 2200176 | A1 | | 4/1974 |
| FR | 2918359 | A1 | | 1/2009 |
| GB | 1 444 634 | A | | 8/1976 |
| JP | 2002/096926 | A | | 4/2002 |

* cited by examiner

*Primary Examiner* — Leslie A Nicholson III
(74) *Attorney, Agent, or Firm* — Sughrue Mion, PLLC

(57) ABSTRACT

The invention relates to a machine for products having a non-circular cross-section, such as ovoid containers or bottles. The machine includes: a collector having cavities arranged obliquely relative to the XX' axis of the conveyor used to supply said products; a means for transferring the batch of products formed into groups by said collector to a depositing station, on a table arranged along said feed conveyor; a means for dropping the batch of products by a reversing movement in an oblique direction; and a means for returning said collector to the starting point, that is, level with the first product on said feed conveyor.

12 Claims, 2 Drawing Sheets

MACHINE AND METHOD FOR FORMING GROUPS OF PRODUCTS TO BE CASED

CROSS REFERENCE TO RELATED APPLICATIONS

This application is a National Stage of International Application No. PCT/FR2010/052920, filed on Dec. 27, 2010, which claims priority from French Patent Application No. 0959662, filed on Dec. 30, 2009, the contents of all of which are incorporated herein by reference in their entirety.

The invention relates to a machine and a method for forming groups of products to be packed in boxes, or cased, and, more particularly, products having a non-circular cross-section, such as ovoid containers and bottles for example.

This type of machine is described in document FR 2 918 359, which concerns a method and a machine for grouping products to be boxed or cased.

This grouping machine comprises: —a feed conveyor which supplies the products to be grouped, —a collection table arranged on the side of the feed conveyor and at the same level, —a mobile collector which captures the products as they move on said feed conveyor, said collector comprising cells arranged in a line transverse to the longitudinal direction in which the products arrive, —a trolley that supports said collector and moves it above said feed conveyer and collection table, —a structure to guide the trolley, and —a control means for said trolley in order to carry out the various product grouping operations in a closed cycle.

The trolley is maneuvered so that the collector moves in repeating motions which loop in a closed cycle consisting of several phases: —a phase dedicated to capturing products on the feed conveyer, —a phase dedicated to transferring the captured products to the collection table, at the depositing station, where an appropriate means takes charge of the batch of captured products in order to box them for example, —and a phase dedicated to returning the collector to the starting point to begin the capture cycle again.

This type of machine allows capturing all types of products and grouping them into a batch, which an appropriate means then takes charge of to perform a final boxing operation for example.

This boxing operation occurs by taking the batch, which is in the form of a row of products, and introducing this row into the box while awaiting the next row or rows. This assembly occupies the allotted space inside said box.

The products captured by this collector are generally regularly-shaped bottles having a circular cross-section. When these products are released by the collector at the depositing station, they form a straight row that is ready for the boxing equipment.

The success of this boxing operation depends primarily on the geometric qualities of the batch, whether it is a batch consisting of a single row of products or a batch containing multiple rows of products.

For certain types of products having a non-circular cross-section, such as bottles having an ovoid cross-section for example, the allotted space in the box requires preparing the batch of products so each item in the row is angled ("angled row"), a pattern that has the advantage of reducing the space occupied by the set of products and properly wedging these products in place in the box.

This type of product requires special arrangements in the grouping machine. Thus, as described in document JP 2002 096926, the products arrive on their side and drop into the cells of an endless belt from which they are ejected by a rake-shaped push tool.

In document FR 2 940 788, the products are captured by a rake-shaped collector oriented obliquely to the longitudinal axis of the products' arrival. In this machine, the product batches are therefore released at an angle by the collector and this requires reorienting the batch in order to box it.

The present invention proposes a machine and a method for grouping these particular products, which overcomes the difficulties encountered in the prior art solutions, in a simple and effective manner.

The means used by the invention group the products in straight rows to form a batch or an assembly of several batches. This is achieved while providing a high level of geometric precision for the batch.

This batch preparation allows the boxing operation to be conducted successfully. The boxing operation may occur as several successive operations using rows of products formed by the collector, or as a single operation in which several rows of products are grouped beforehand to form a batch which comprises a total number of products corresponding exactly to the number of products that can fit into the box.

The product grouping machine of the invention comprises:
a conveyor which supplies aligned and spaced-apart products;
a rake-shaped collector which extends perpendicularly to the longitudinal feed axis xx';
a table arranged level with and next to said conveyor, with a depositing station where the batch of products is collected for packing;
a structure appropriate for supporting and allowing the longitudinal and transverse movement of said collector relative to said feed conveyor, above said conveyor and above said table for collecting the batches of products;
and it comprises a collector which is arranged to capture and orient products which arrive upright and have a non-circular horizontal cross-section that is ovoid, said collector comprising cells arranged obliquely relative to the longitudinal feed axis xx' in order to orient said products automatically in an "angled row" configuration as they are captured.

Still according to the invention, the cells of the collector are angled along an oblique axis which forms an angle a of between 10 and 45° with the longitudinal axis xx'.

In another arrangement of the invention, the grouping machine comprises a rake-shaped collector fashioned from a rectangular plate of a thermoplastic material, said collector comprising cells regularly distributed along its length.

Still according to the invention, the collector comprises cells of a shape which corresponds to that of the products to be captured, to avoid damaging the surfaces of said products and, in the case of high throughput speeds, to avoid the risk of the product rebounding during capture after fully entering the corresponding cell.

In another arrangement of the invention, the collector consists of two superimposed rakes with cells, fashioned as a unit or fashioned from two plates assembled together, separated by spacers, to provide doubled support for the products to improve their stability, particularly as they are moved between the feed conveyor and the depositing station on the collection table.

Still according to the invention, the grouping machine comprises a means for detecting a product to be captured on said feed conveyor, said means being arranged laterally to and upstream from said collector.

In another arrangement of the invention, the grouping machine comprises a collection table for the products which consists of an endless belt conveyor, said conveyor being controlled to ensure an accumulation which allows grouping several batches of products formed by the collector.

Still according to the invention, the grouping machine comprises two collection tables for captured products, said collection tables consisting of panels or endless belt conveyors which extend on each side of the feed conveyor supplying said products, to allow depositing said products moved by the collector on each side of said feed conveyor.

In another arrangement of the invention, the grouping machine comprises at least one robot which takes the products arranged in an angled row configuration on the collection table, said robot comprising a head arranged to collect the batch of products and place them in a box or boxes.

The invention also relates to the method implemented by the machine as detailed above, and in particular a method of grouping products which are aligned and spaced apart on a feed conveyor, said method comprising the following steps:

a step of capturing said products with a rake-shaped collector which is arranged transversely to the direction in which said products arrive;

a step of transferring said products to a table arranged alongside said feed conveyor, a step of releasing the batch of products at the depositing station;

a step of returning said collector to the starting point, meaning to the first product on said feed conveyor;

and additionally consisting of:

capturing upright products having a non-circular horizontal cross-section, of the ovoid type, by means of a collector having cells arranged obliquely relative to the direction in which said products arrive, orienting said products automatically, simultaneously with the capture operation, to place them in an angled row configuration, and, during the release operation, moving said collector in a reversing movement which is parallel to the orientation of said cells.

Still according to the invention, the grouping method consists of placing the products grouped by the collector alternately on each side of the feed conveyor, meaning on the right side and left side of said feed conveyor, to reduce the packing speeds for the product batches so formed, at the depositing stations.

In another arrangement of the invention, the grouping method consists of placing adjacent to each other, at the depositing station, several rows of products grouped into batches, before they are all taken away for boxing by an appropriate means such as a robot or other means.

The invention is described below in a sufficiently clear and complete manner to enable its execution. This description is accompanied by the attached drawings, in which:

FIG. 1 schematically illustrates a machine of the invention, meaning a machine for orienting, and grouping in an angled row, products having a non-circular cross-section where they are taken by the collector, said machine being shown in a plan view;

FIG. 2 schematically represents an elevation view of the machine for orienting and grouping products represented in FIG. 1;

Figure 1:
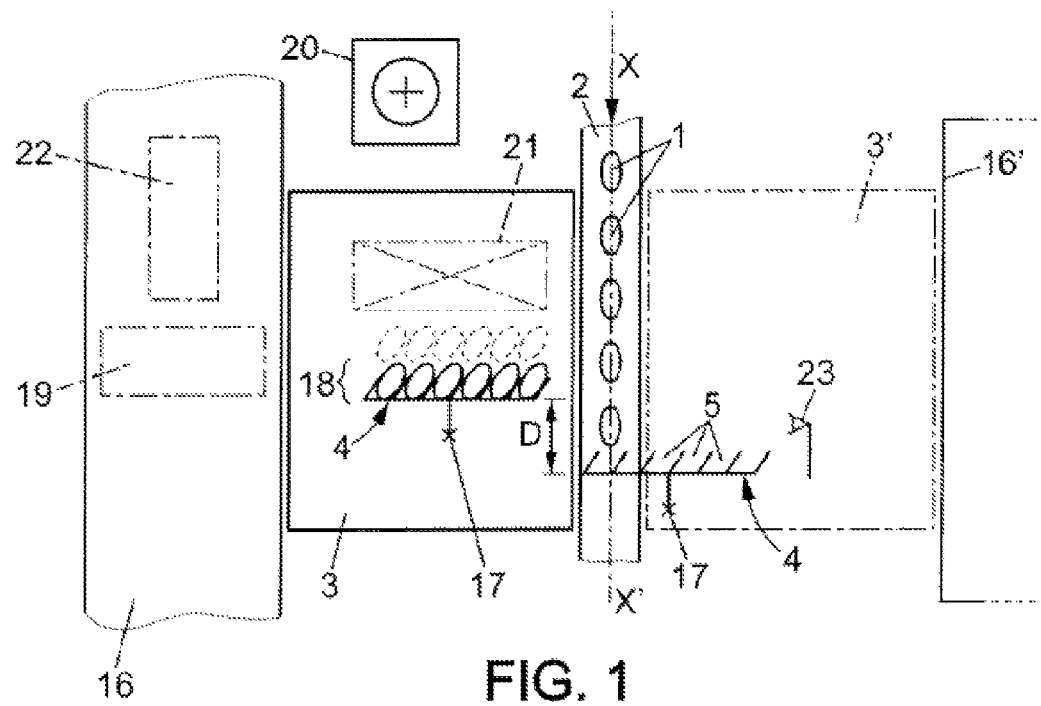
Figure 2:
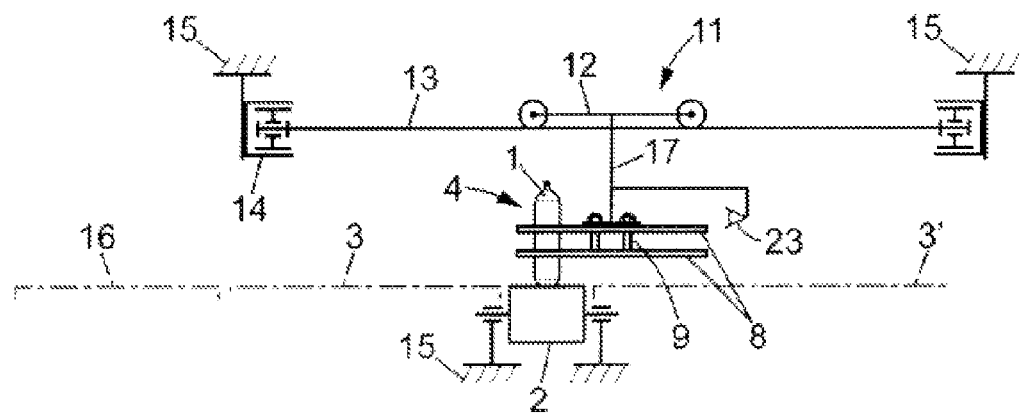

FIGS. 1 and 2 schematically illustrate a machine for orienting and grouping products 1 such as bottles or containers which are grouped in the upright position. This machine is similar to the one described in the abovementioned document FR 2 918 359.

The products 1 have a horizontal cross-section in their capture area which is ovoid in shape, not circular, for example an oval defined by a major axis and a minor axis.

The machine comprises a conveyor 2 that is a continuously moving endless belt which conveys the products 1. This feed conveyor 2 is supplied by another machine, not represented, positioned upstream, which corresponds for example to a labeling machine. On this feed conveyor 2, the products are arranged upright in single file and spaced apart from each other. This spacing is preferably regular, obtained by means of an appropriate device not represented.

The products 1 are all arranged in the same manner on the feed conveyor 2; they are oriented so that their major axis coincides with the longitudinal axis xx' of said feed conveyor 2.

The machine also comprises at least one table 3 extending along the feed conveyor 2, for collecting the products 1. A table 3 has been represented with solid lines on the right side (relative to the downstream direction) of the feed conveyor 2, and another table 3' has been represented with dotted lines on the left side.

The conveyor 2, the table 3, and the table 3' depending on the case, are positioned side by side in the same plane, to allow the level transfer of the products 1 from said conveyor 2 to said table 3 or 3'. This transfer occurs by means of a collection device which will be referred to in the rest of the description as the collector 4.

This collector 4 is in the form of a rectilinear rake which circulates above the downstream end of the feed conveyor 2 and parallel to the plane of the conveyor and of the table 3 and table 3' depending on the case; it travels transversely and longitudinally relative to the longitudinal axis xx' of said feed conveyor 2.

Figure 3:
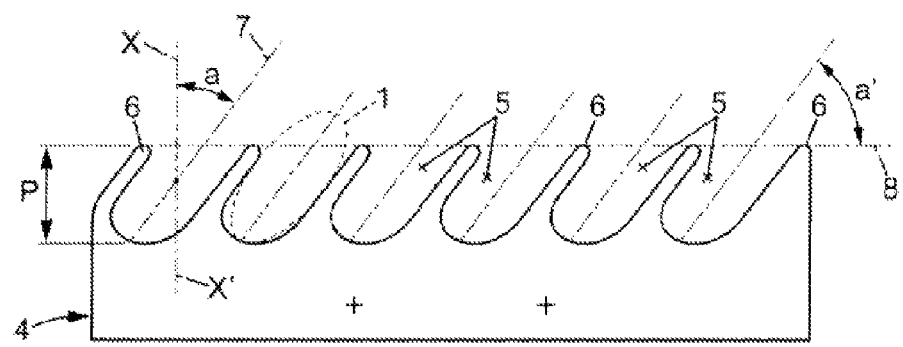
FIG. 3 shows more details of a collector which performs the orienting and grouping in an angled row of these particular products having a non-circular cross-section, such as ovoid bottles for example.

This collector 4 appears in more detail in FIG. 3. It is, for example, fashioned from a rectangular plate of thermoplastic material and comprises cells 5 that are laterally delimited by teeth 6. The cells 5 are open on one of the large sides of the collector 4 and in particular on the side which is normally facing the upstream direction of the feed conveyor 2, in order to accept the products 1 arranged on said conveyor.

The cells 5 are arranged obliquely relative to the longitudinal axis xx' of the feed conveyor 2, said axis xx' also corresponding to the longitudinal axis along which the products 1 arrive on said conveyor 2.

The oblique angle of the axis 7 of these cells 5 relative to the longitudinal axis xx' of the products' arrival, as represented in FIG. 3, corresponds to an angle a which is between, for example, 10 and 45° depending on the shape and type of the products 1 to be captured.

This oblique angle of the axis 7 of the cells 5 may also be measured directly on the rake, using as a reference a line 8 passing through the upstream end of the teeth 6. The complementary angle a' is between 45 and 80°, for example.

Preferably, the shape of the cells 5 is adapted to that of the products 1 to be captured, to avoid damaging the external surfaces and in particular the labels placed on said surfaces, and this shape is also chosen to avoid rebound phenomena when the product 1 has fully entered said cell.

Depending on the type of products 1, and in particular its stability, meaning the position of its center of gravity, a collector 4 may be used which consists of several superimposed rakes.

Figure 4:
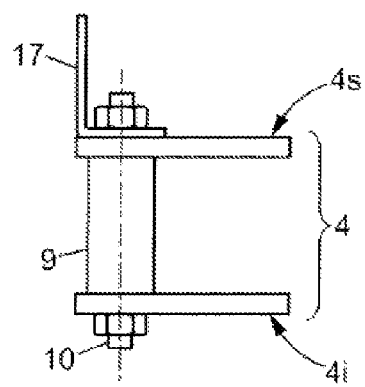
FIG. 4 shows a side view of the superposition and assembly of two collectors.

FIG. 4 is a side view showing a collector 4 comprising two superimposed rakes: a lower rake 4i and an upper rake 4s which are spaced apart by a gap chosen according to the products to be grouped.

These rakes are either fashioned of a single block of thermoplastic material, or of two separate plates separated by one or more spacers 9 and assembled together by means of bolts 10 or other fasteners which also allow mounting the collector 4 onto the means that maneuvers it above the conveyor 2 and the table 3 as described below.

As represented in FIG. 2, this collector 4, whether it consists of one or more rakes 8, is associated with a structure 11 of the type described in the aforementioned document FR 2 918 359. Servomotors, not represented, ensure the movements of the collector 4 in the direction which corresponds to the longitudinal axis xx' along which the products arrive, and transversely, perpendicularly to said axis xx'.

The structure 11 moves relative to the feed conveyor 2 and relative to the table 3, and to the table 3' depending on the case. This structure 11 comprises a trolley 12 which supports the collector 4 and a beam 13 which supports said trolley 12. The beam 13 is arranged transversely to the conveyor.

The beam 13 is located above the collector 4, at a distance that is distinctly greater than the maximum height of the products 1 to be processed by the machine. This beam 13 is guided by rails 14 longitudinally arranged along the edge of the table 3 or tables 3 and 3' depending on the case, said rails 14 being integrally attached to the general frame 15 of the machine and said beam 13 being moved by the effect of an appropriate servomotor device.

The trolley 12 is supported by the beam 13 and is moved on this beam 13 also by means of an appropriate servomotor device. The trolley 12 thus sweeps across an entire portion of the surface of the feed conveyor 2 and the collection table 3, as well as the table 3' depending on the case.

An appropriate control means allows maneuvering the collector 4 in an oblique direction, parallel to the axis of the cells 5 for capturing the products 1, in order to place said products 1 on the table 3 or 3' depending on the case. This control means acts on the servomotors which move the trolley 12 and the beam 13.

The collector 4 may place the products 1 on either side of the feed conveyor 2, meaning on the table 3 or the table 3' represented as dotted lines.

The table 3, similarly to the table 3', may consist of a fixed plane or consist of a conveyor belt having a role which is explained below.

This table 3 may be extended on its free lateral side by a conveyor 16 on which, for example, the boxing operation for a batch of products 1 may be performed; this may also be the case for the table 3', as represented with dotted lines, which may comprise a laterally arranged conveyor 16'.

This boxing operation will be detailed below.

Figure 5:
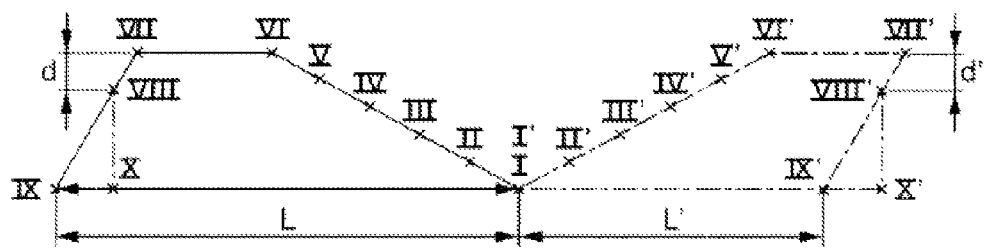
FIG. 5 shows the looping paths of the collector, represented with solid lines or dotted lines depending on whether it is depositing its batch of products to the right or left of the feed conveyor, said direction being relative to the advancement of said products.

FIG. 5 shows the path of the collector 4 above the conveyor 2 and the table 3 and, in dotted lines, above the table 3'.

This path, which is a closed loop, comprises a series of movements occurring in a cycle which begins at the first capture point for a product 1 on the feed conveyor 2, and continues upstream on said conveyor 2, through different progressively offset capture points.

In the example represented, six products 1 can be captured by the collector 4 before they are laterally transferred to the table 3 and/or 3'.

One will note in FIG. 5 that the collector 4 moves in a transverse motion and a longitudinal motion during the phase of capturing products 1, said motions being, for example, combined; by this longitudinal motion along xx', the collector 4 moves back up the line of products 1 by advancing above the conveyor 2, in a direction which is the opposite the direction in which said conveyor 2 and said products 1 are advancing.

The collector 4 advances longitudinally along the axis xx' for a total distance D, indicated in FIG. 1, which may correspond, for example, to at least the dimension of the step size between the products 1 on the conveyor 2.

This portion of the longitudinal path for capturing products 1, as represented in FIG. 5, extends between the capture point for the first product and the capture point for the last product. This path is represented as a straight line with points denoted in roman numerals from I to VI, said points corresponding, for example, to the placement of the arm 17 extending under the trolley 12 and carrying the collector 4.

After the last product is captured, the collector 4 is moved transversely between points VI and VII, still using Roman numerals, so as to move away from the conveyor 2 on which are arranged the products 1 which continue to arrive; this transverse movement allows the collector 4 to transfer its batch of products 1 onto the collection table 3, and to place it at a station denoted 18 which can be called the depositing station 18.

This depositing station 18 is located level to or substantially upstream from the last capture point for products 1 on the conveyor 2.

At this depositing station 18, the batch of products 1 may be placed against a guide or a holding structure, not represented, which stabilizes the position of said products 1 when they arrive and when the collector 4 is retracted.

The collector 4 then retreats from point VII to point IX, along an oblique trajectory where the angle corresponds to the angle of the oblique axis 7 of the cells 5. This trajectory may consist of a single straight line from point VII to point IX, or a broken line which comprises a first oblique trajectory section between points VII and VIII followed by a second trajectory section between points VIII and X, said second trajectory being parallel to the longitudinal axis xx'.

The first section of the retreating trajectory, between points VII and VIII, is of a length which is denoted d in FIG. 5, substantially corresponding to the depth P of the cells 5 represented in FIG. 3.

From point IX or X, depending on the case, the collector 4 returns transversely along a portion of length L to point I, where it is repositioned in front of the first product 1 arriving on the conveyor 2.

The return of the collector 4 to the starting point occurs at a speed which is greater than the speed at which the conveyer 2 is advancing, so that it can move ahead of the first product 1 which continued to advance while the following various operations are occurring:

the operation of transferring the batch of products 1, the operation of releasing said batch at the depositing station 18, and the operation of returning the collector 4 to the starting point so it is again positioned in front of the first product 1 which arrives on the feed conveyor 2.

FIG. 5 also illustrates, in dotted lines, a loop which corresponds to the path of the collector 4 when the batch of products 1 is placed on collection table 3'. The path of the collector 4 between points I' to VI', still using Roman numerals, is identical to the path represented in FIG. 5, as is the transverse movement between point VI' and point VII'. However, the movement of the collector 4 in order to release the batch of products 1 also occurs obliquely; this oblique movement between points VII' and IX' substantially reduces the length L' of the transverse return of the collector 4.

This oblique retreating motion of the collector 4 may therefore also occur along two trajectories:
- a first trajectory which consists of a single straight line, as indicated above, between points VII' and IX', at an angle relative to the axis xx' which corresponds to that of the oblique axis 7 of the cells 5;
- a second trajectory in the form of a broken line which comprises a first oblique trajectory section between points VII' and VIII' followed by a second section between points VIII' and X', said second section being parallel to the longitudinal axis xx'; said first section is of a length d' which substantially corresponds to the depth P of said cells 5.

This arrangement allows placing the set of products 1 captured by the collector 4 alternately on each side of the conveyor 2, meaning on the right side and left side of said feed conveyor 2, to reduce the packing speeds for the product batches so formed, at the respective depositing stations on the tables 3 and 3'.

The length of the oblique path d, d' may be reduced to a value which corresponds to the depth P of the cells 5, meaning a value sufficient for the collector 4 to quickly initiate its return movement towards the capture point for the first product 1.

The distinction of the collector 4 lies in the fact that it pivots the products 1 when they are on the conveyor 2 and upright. The oblique orientation of the cells 5 facing the products 1, which arrive with their major horizontal axis oriented along the longitudinal axis of their advancement, automatically groups the products 1 in an angled row configuration. This orientation of the products 1 also occurs automatically due to the mode in which the products 1 are captured, which occurs as the products are advanced by the feed conveyor 2, meaning that the products 1 are oriented and positioned automatically in each cell 5 due to the speed at which they enter said cells 5.

As represented in FIG. 1, this grouping of the products 1 in an angled row configuration allows forming complete batches of products which correspond, for example, to the number of products that can be placed in a box.

A box 19 conveyed by the conveyor 16 is represented in FIG. 1. Thus, for wrap-around boxes 19, the batch of products may simply be packed at the depositing station 18 by using a pushing device which moves them transversely onto a wrap-around blank 19.

Or the batch of products 1 may be collected using a robot, indicated in the diagram by its pedestal 20, which has a gripping head 21 that seizes the batch at the depositing station 18, for example pressing the products closer together as it does so, in order to introduce them into a slotted container 22, of the "American box" type.

The formation of a complete batch on the collection table 3, or table 3', may be facilitated by using the upper surface of an endless belt conveyor as the collection area; this conveyor can automatically shift the batch of products 1 after they are released by the collector 4, to accumulate them in a manner that groups together several batches of products formed by the collector (4); this allows leaving room for a second batch which can be grouped and associated with the first deposited batch in a very simple manner.

As is the case for the machine described in document FR 2 918 359, it is preferable to stop the motion of the collector 4 at the moment the products are captured 1. Thus, as represented in FIGS. 1 and 2, the trolley 12 comprises a sensor 23 integrally attached to the collector 4 and positioned upstream from it, for detecting the presence of products 1 on the feed conveyor 2. An appropriate calculation means takes this information into account, meaning the position of the first product 1 on the feed conveyor relative to the collector 4, as well as information concerning the speed of said feed conveyor 2, to trigger the capture cycle for each product 1 as it arrives in the vicinity of said collector 4.

The invention claimed is:

1. A machine for grouping products, comprising:
 a feed conveyor which supplies aligned and spaced-apart products along a longitudinal feed axis;
 a rake-shaped collector which extends perpendicularly to said longitudinal feed axis;
 a table arranged level with and next to said feed conveyor, with a depositing station where batches of products are collected for packing;
 a supporting structure for supporting and allowing longitudinal and transverse movements of said collector relative to said feed conveyor, above said feed conveyor and above said table for collecting said batches of products;
 wherein said collector is arranged to capture and orient products which arrive upright and have an ovoid cross-section, said collector comprising cells arranged obliquely relative to said longitudinal feed axis in order to orient said products automatically in an angled row configuration as said products are captured.

2. The machine for grouping products according to claim 1 wherein said cells of said collector are angled along an oblique axis which forms an angle a of between 10 and 45° with said longitudinal feed axis.

3. The machine for grouping products according to claim 1 wherein said rake-shaped collector is fashioned from a rectangular plate of a thermoplastic material, wherein the cells are regularly distributed along a length of said collector.

4. The machine for grouping products according to claim 1 wherein said cells have a shape which corresponds to said ovoid cross-section of said products to be captured, to avoid damaging surfaces of said products and to avoid the risk of said products rebounding during capture after fully entering said cells.

5. The machine for grouping products according to claim 4, wherein said rake-shaped collector comprises two superimposed rakes, each rake comprising a portion of said cells, the superimposed rakes are fashioned as a unit or from two plates assembled together, separated by spacers, to provide doubled support for the products to improve their stability, at least as the products are moved between said feed conveyor and said depositing station on said table.

6. The machine for grouping products according to claim 1, comprising a detector for detecting the presence of a product to be captured on said feed conveyor, said detector being arranged laterally to and upstream from said collector.

7. The machine for grouping products according to claim 1, wherein said table for collecting the products comprises an endless belt conveyor, said endless belt conveyor being controlled to ensure an accumulation which allows grouping several batches of products formed by said collector.

8. The machine for grouping products according to claim 1, comprising a second table for captured products, said tables comprising panels or endless belt conveyers which extend on each side of said feed conveyor supplying said products, to allow depositing said products moved by said collector on each side of said feed conveyor.

9. The machine for grouping products according to claim 1, comprising at least one robot which takes products arranged in an angled row configuration on said table, said robot comprising a head arranged to collect at least one batch of products and place said at least one batch in a box.

10. A method of grouping products which are aligned and spaced apart on a feed conveyor on which the products arrive in a direction, said method comprising the following steps:
- a step of capturing said products with a rake-shaped collector which is arranged transversely to said direction in which said products arrive, so as to form a batch of products;
- a step of transferring said batch of products to at least one table arranged alongside said feed conveyor,
- a step of releasing said batch of products at a depositing station defined on said table;
- a step of returning said collector to a starting point, corresponding to a first product on said feed conveyor for a next batch of products to be formed,
- wherein the method comprises capturing upright products having an ovoid cross-section, by means of a collector having cells arranged obliquely relative to said direction in which said products arrive,
- orienting said products automatically, simultaneously with their capture operation, to place said products in an angled row configuration,
- and, during their release operation, moving said collector in a reversing movement which is parallel to an orientation of said cells.

11. The method for grouping products according to claim 10, comprising placing products grouped by said collector alternately on the left side and on the right side of said feed conveyor, to reduce packing speeds for the product batches so formed, at two depositing stations each defined on one respectively of two tables arranged one on the left side and the other of the right side of said feed conveyor.

12. The method for grouping products according to claim 10, comprising placing adjacent to each other, at said depositing station, several rows of products grouped into batches, before said batches are all taken away for boxing by a boxing device.

* * * * *